United States Patent
Yadav et al.

(10) Patent No.: US 12,134,085 B2
(45) Date of Patent: Nov. 5, 2024

(54) STEAM REFORMING CATALYSTS FOR SUSTAINABLE HYDROGEN PRODUCTION FROM BIOBASED MATERIALS

(71) Applicant: Ganapati Dadasaheb Yadav, Mumbai (IN)

(72) Inventors: Ganapati Dadasaheb Yadav, Mumbai (IN); Ashish Dilip Shejale, Mumbai (IN)

( * ) Notice: Subject to any disclaimer, the term of this patent is extended or adjusted under 35 U.S.C. 154(b) by 458 days.

(21) Appl. No.: 17/608,182

(22) PCT Filed: May 11, 2020

(86) PCT No.: PCT/IN2020/050428
§ 371 (c)(1),
(2) Date: Nov. 2, 2021

(87) PCT Pub. No.: WO2020/230160
PCT Pub. Date: Nov. 19, 2020

(65) Prior Publication Data
US 2022/0203341 A1  Jun. 30, 2022

(30) Foreign Application Priority Data
May 10, 2019 (IN) .............................. 201921018837

(51) Int. Cl.
*B01J 23/755* (2006.01)
*B01J 23/10* (2006.01)
(Continued)

(52) U.S. Cl.
CPC ............. *B01J 23/755* (2013.01); *B01J 23/10* (2013.01); *B01J 23/72* (2013.01); *B01J 35/635* (2024.01); *B01J 35/638* (2024.01); *B01J 35/647* (2024.01); *C01B 3/326* (2013.01); *C01B 2203/0233* (2013.01); *C01B 2203/1058* (2013.01);
(Continued)

(58) Field of Classification Search
CPC .... C01B 2203/1082; C01B 2203/0233; C01B 3/326; B01J 23/10
See application file for complete search history.

(56) References Cited

PUBLICATIONS

Shejale, et al, Cu promoted Ni—Co/hydrotalcite catalyst for improved hydrogen production in comparison with several modified Ni-based catalysts via steam reforming of ethanol, Int. J. Hyd. Energy, 42 (2017) 11321-11332 (Year: 2017).*

* cited by examiner

*Primary Examiner* — Daniel Berns
*Assistant Examiner* — Eric Scott Sherman
(74) *Attorney, Agent, or Firm* — Jose Cherson Weissbrot

(57) ABSTRACT

The present invention relates to a steam reforming catalyst for hydrogen production. More specifically, the present invention provides a novel catalysts support for sustainable hydrogen production by steam reforming process using bio-based materials feedstock such as ethanol, glycerol, n-butanol and ethylene glycol. The said improved support catalyst and metal doped catalysts therefrom, are comprising of combination of crystalline Mesoporous cellular foam (MCF) silica and basic site assistant for enhancing catalytic activity of doped active metals thereon and lower coke formation. The benefits of present invention is in the cost efficient steam reforming process for hydrogen production, wherein the said catalysts are efficiently providing a high reactant conversion at lower temperature, no coke formation, high thermal stability for longer time and effective catalytic performance for multiple cycles.

9 Claims, 12 Drawing Sheets

(51) Int. Cl.
  *B01J 23/72* (2006.01)
  *B01J 35/63* (2024.01)
  *B01J 35/64* (2024.01)
  *C01B 3/32* (2006.01)
(52) U.S. Cl.
  CPC ................ *C01B 2203/1076* (2013.01); *C01B 2203/1082* (2013.01)

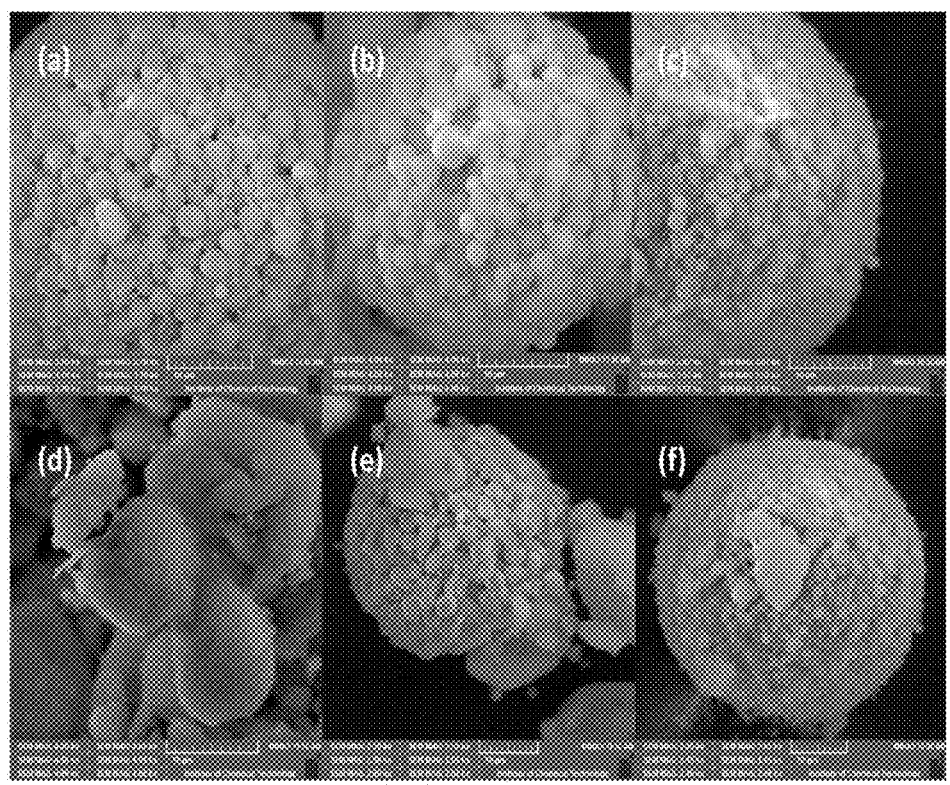
Figure No. 1

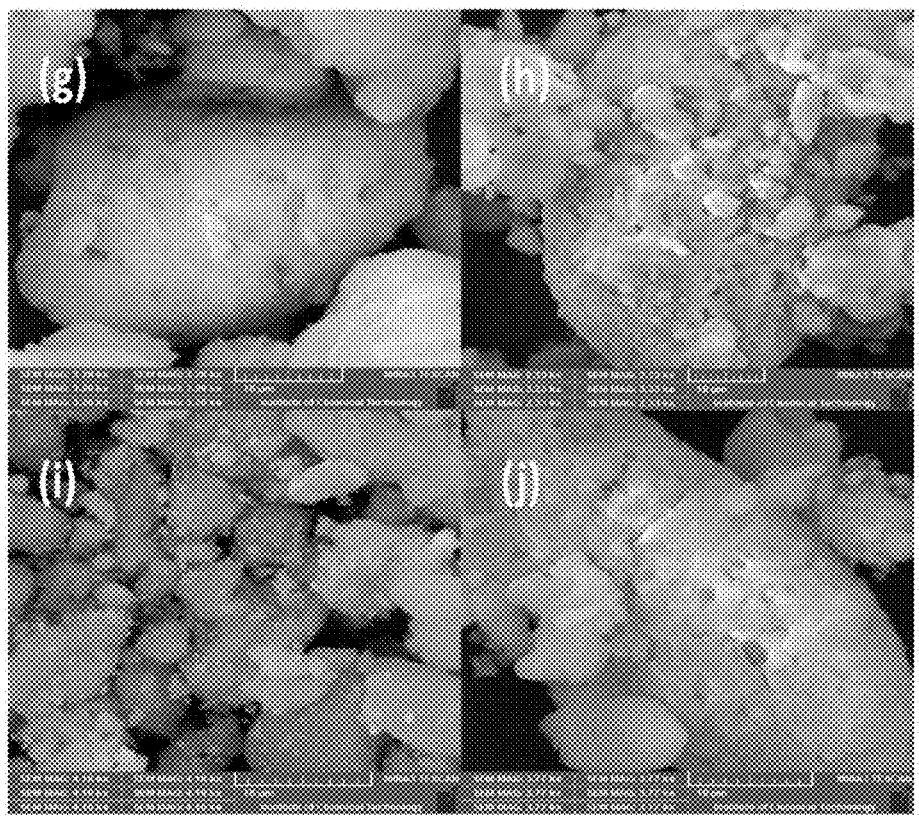
Figure No. 2

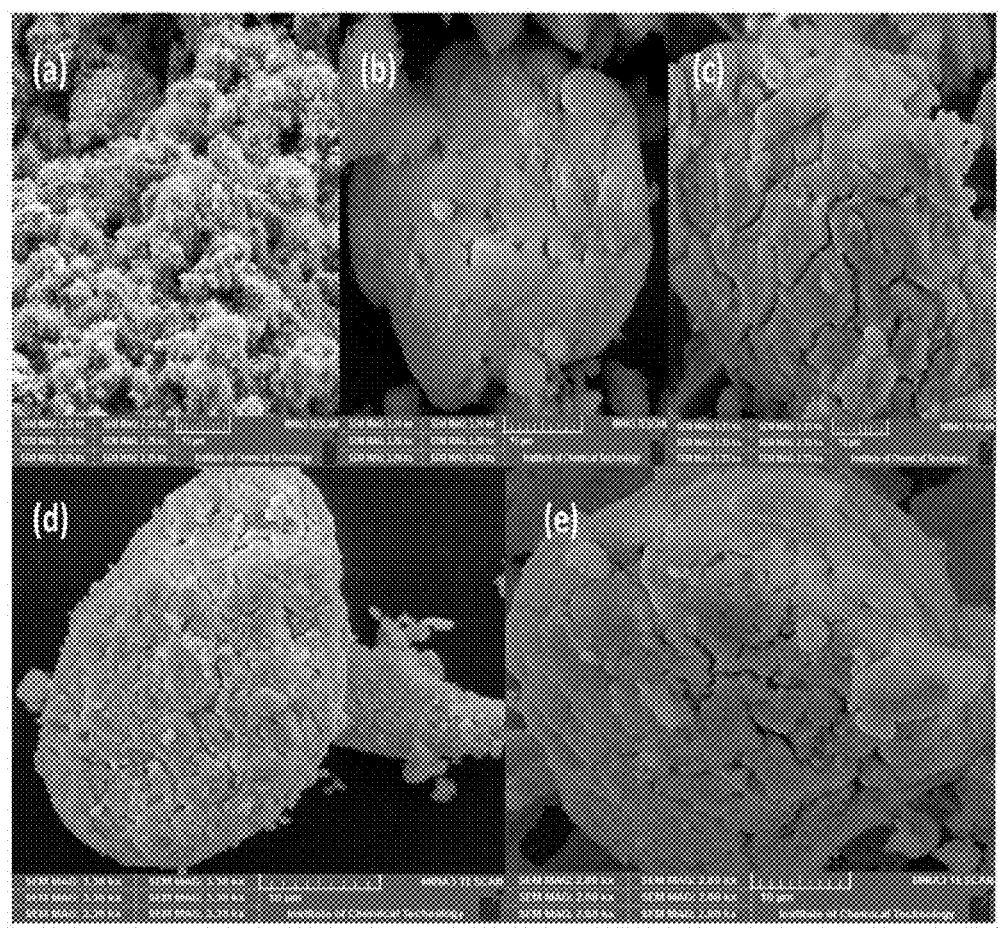
Figure No. 3

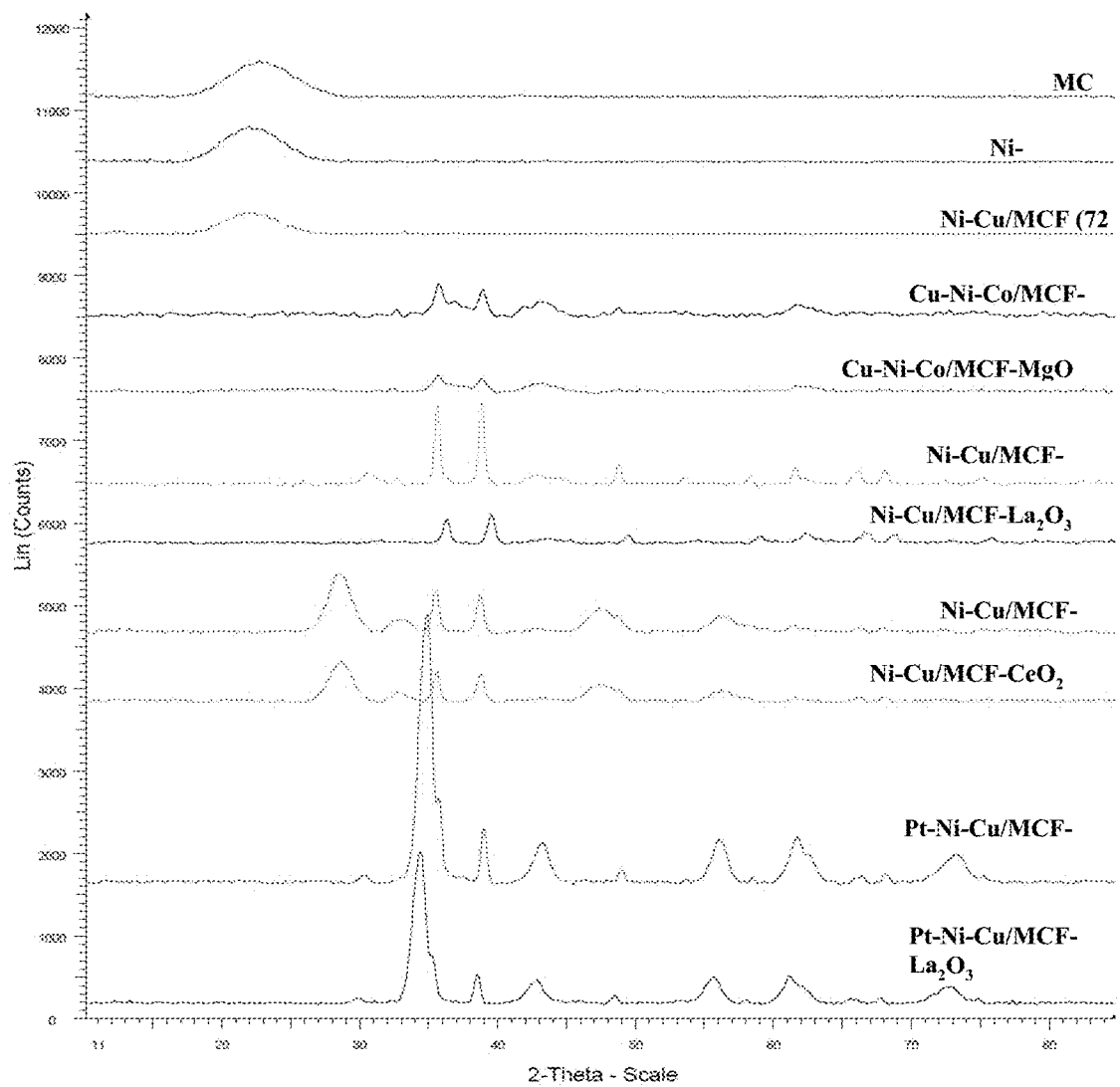
Figure No. 4

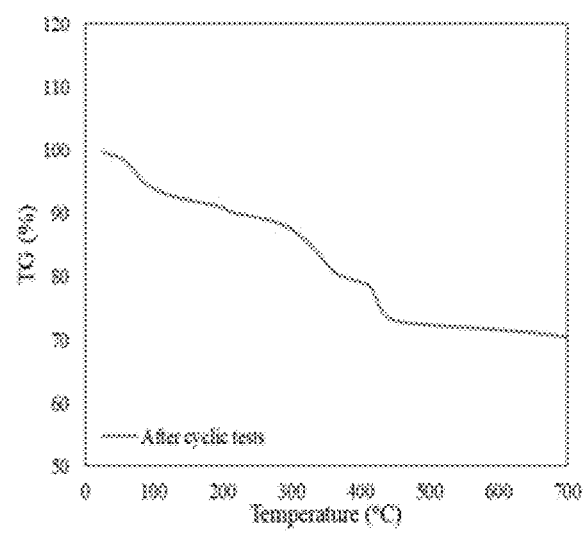
Figure No. 5

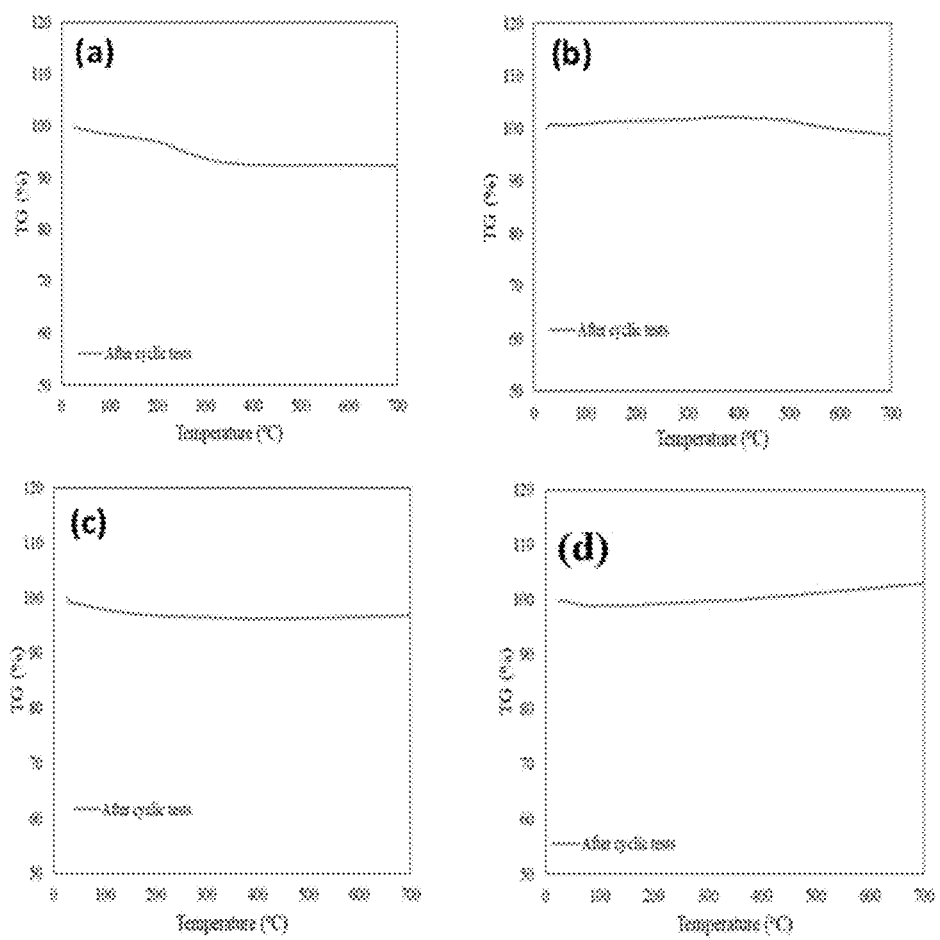
Figure No. 6

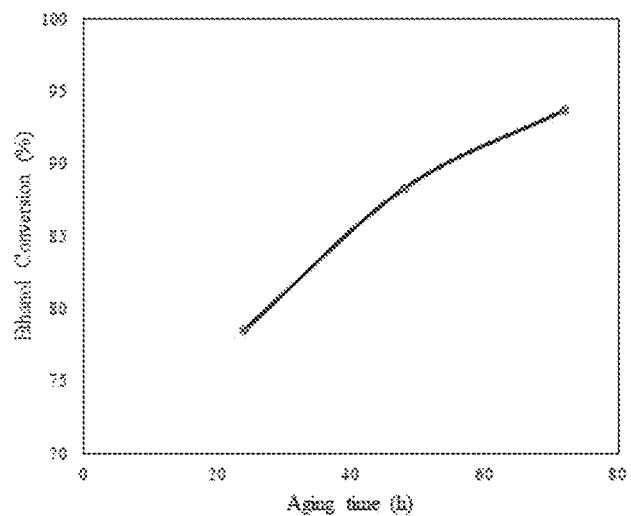
(a)
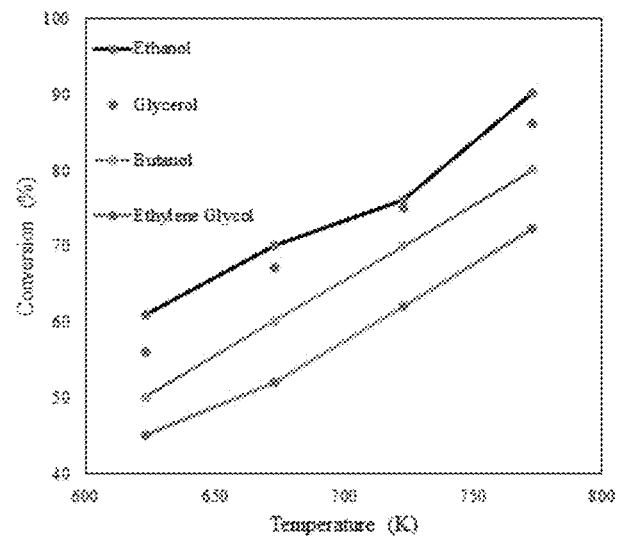
(b)
Figure No. 7

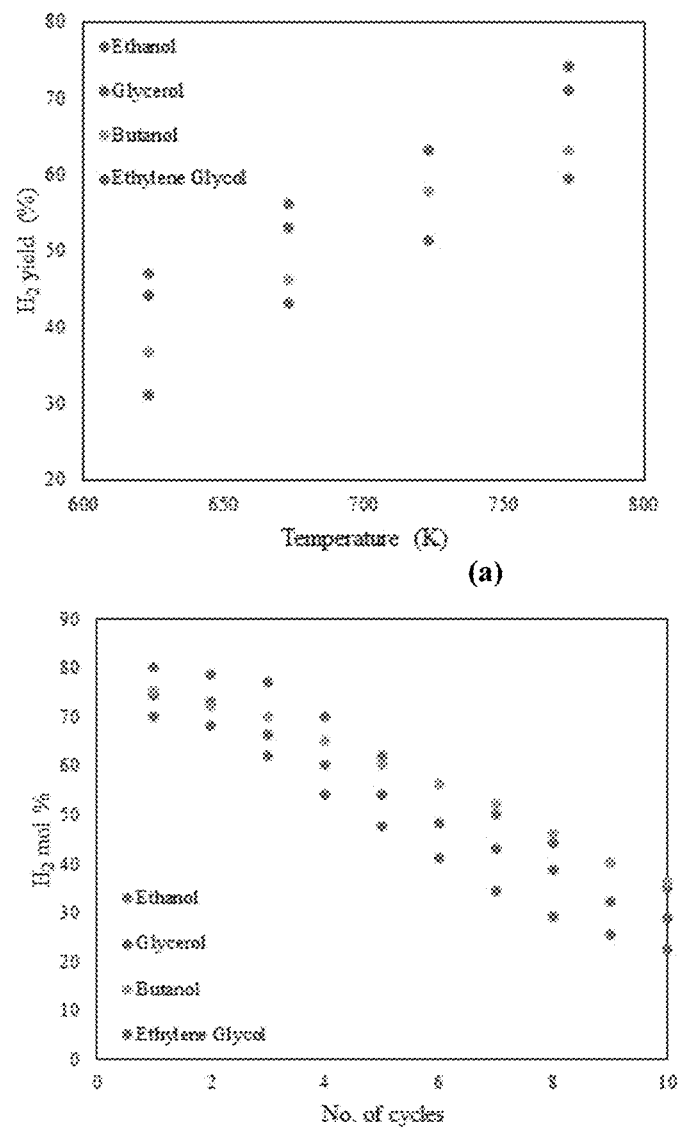
(b)
Figure No. 08

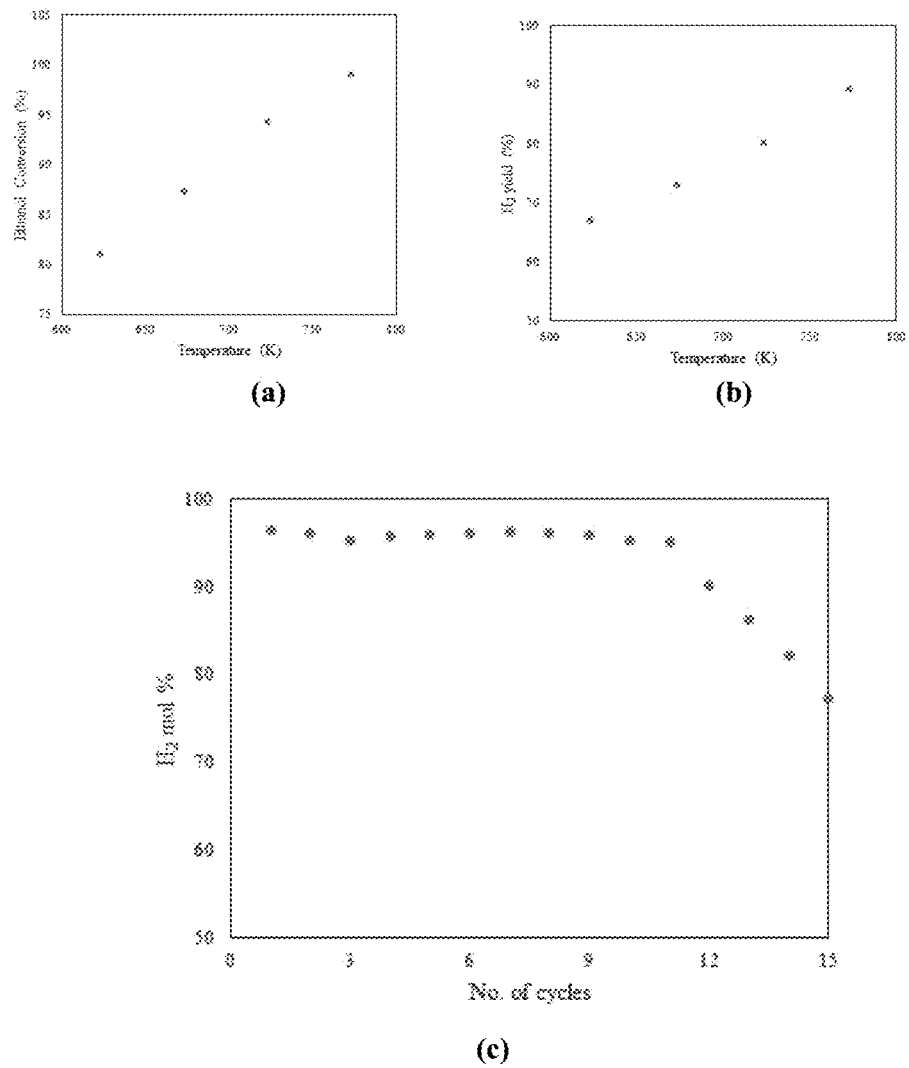
Figure No. 9

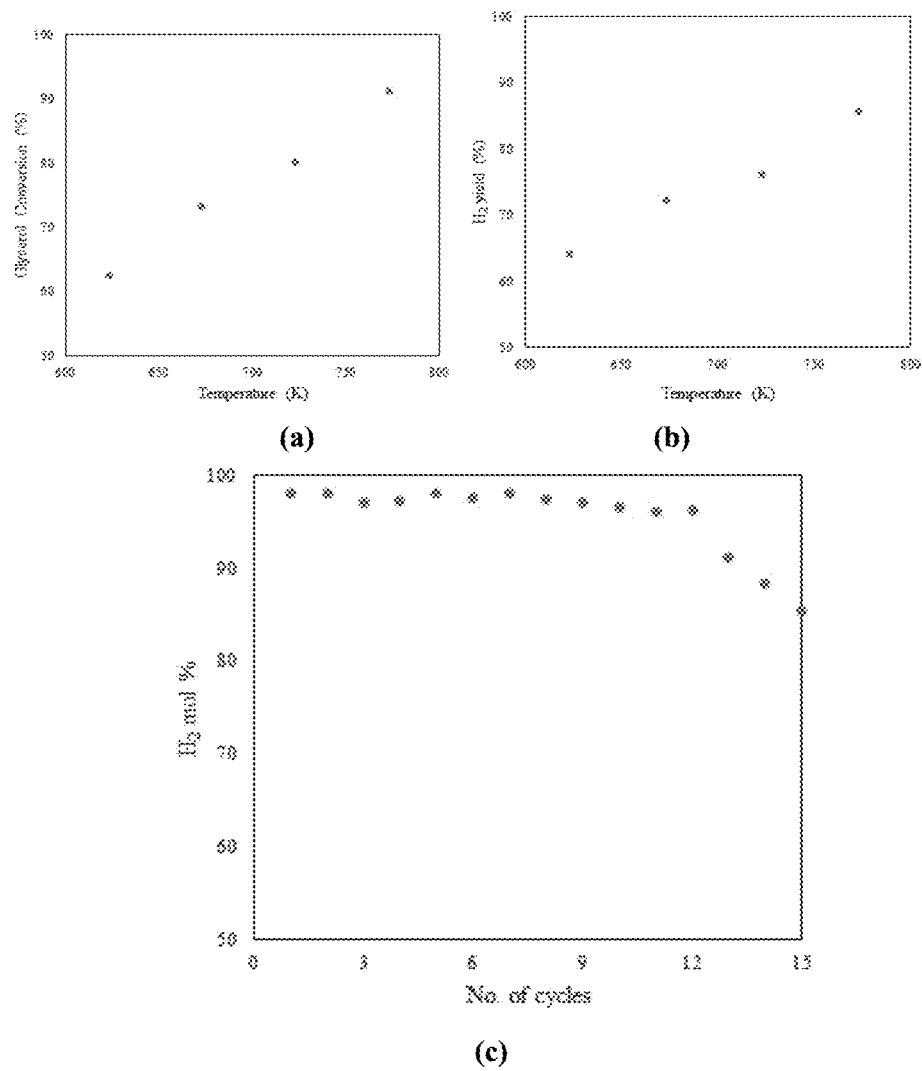
Figure No. 10

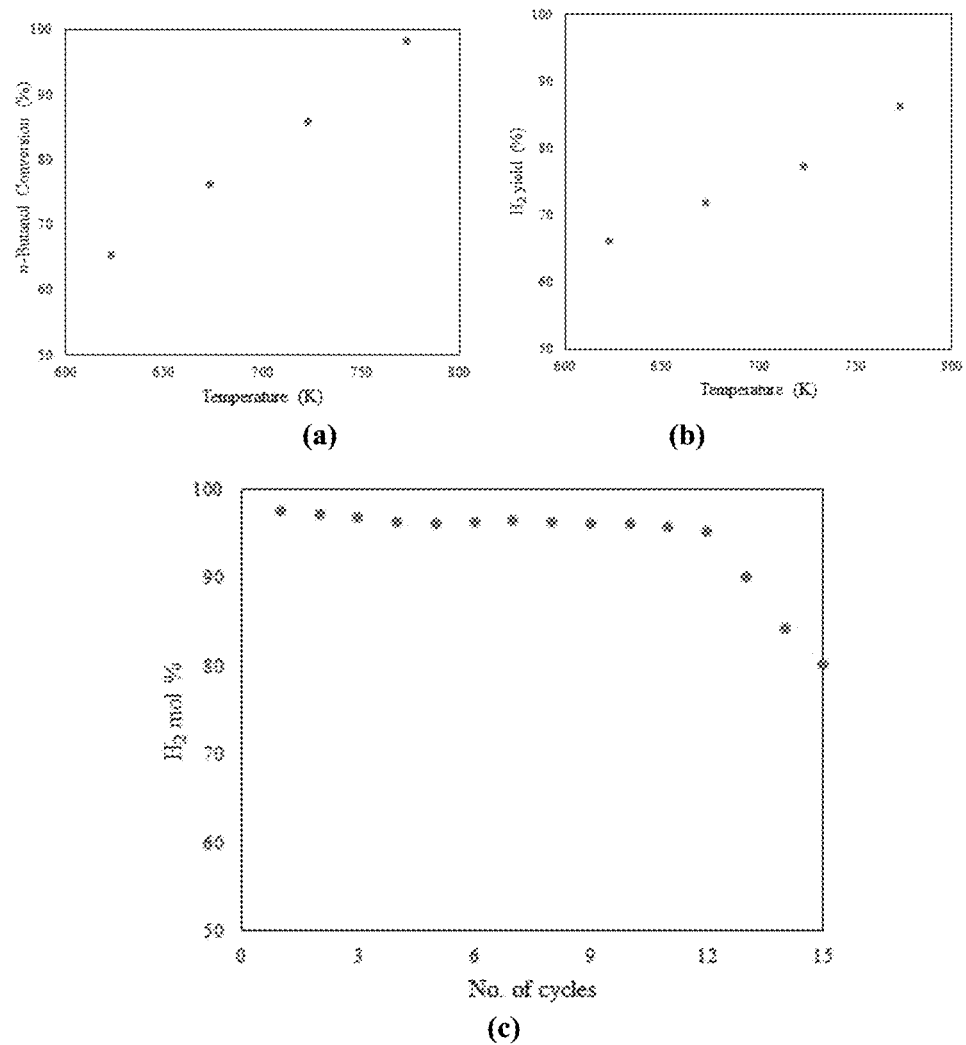
Figure No. 11

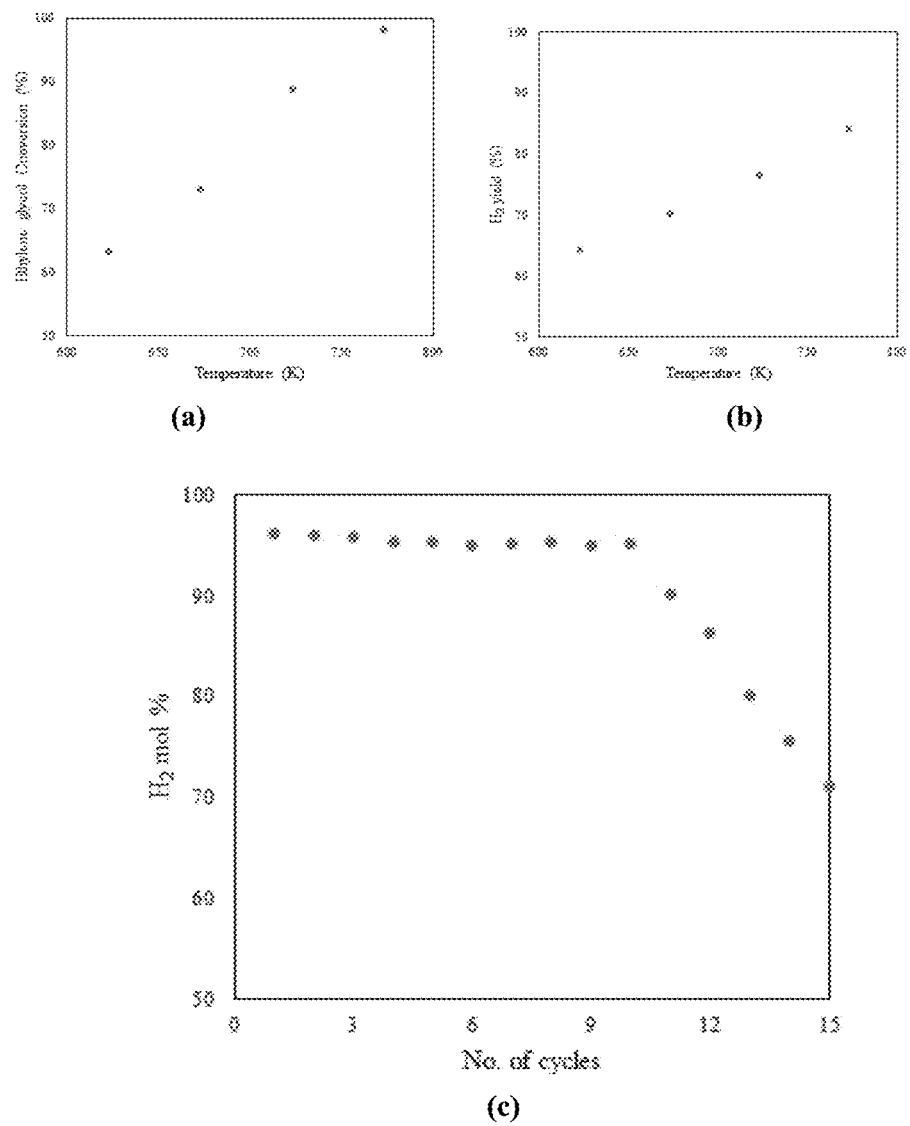
Figure No. 12

STEAM REFORMING CATALYSTS FOR SUSTAINABLE HYDROGEN PRODUCTION FROM BIOBASED MATERIALS

FIELD OF INVENTION

The present invention relates to a steam reforming catalysts composition for sustainable hydrogen production. More specifically, the present invention provides a novel catalyst-support composition system for sustainable hydrogen production by steam reforming process using bio-based materials feedstock such as ethanol, glycerol, n-butanol and ethylene glycol. The said improved supported catalyst and metal doped catalysts therefrom, are comprising of combination of crystalline Mesoporous cellular foam (MCF) silica and basic site assistant for enhancing catalytic activity of doped active metals thereon and offers lower coke formation. The benefits of present invention are in the cost efficient steam reforming process for hydrogen production, wherein the said catalysts are efficiently providing a high reactant conversion at lower temperature, no coke formation, high thermal stability for longer time and effective catalytic performance for multiple cycles.

BACKGROUND OF THE INVENTION $H_2$ synthesis from bio-based sources is a feasible solution owing to its ample availability, renewable and carbon-neutral nature. So far, researchers explored several bio-based sources such as hydrocarbons, ethanol, glycerol, n-butanol and ethylene glycol for steam reforming (SR) in $H_2$ production owing to their high $H_2$ content, ease of availability, non-toxic nature and its sustainable feature. Where, the said steam reforming feed stock is reacted with steam in presence of catalyst, a steam reforming process to produce hydrogen. For efficient steam reforming reaction requires a catalyst, there is a noble as well as transition active metals were used in this reaction selected from nickel, cobalt, copper and platinum.

Following reaction scheme represents reaction for steam reforming of ethanol [SRE] (Eq. 1), steam reforming of glycerol [SRG] (Eq. 2), steam reforming of n-butanol [SRB] (Eq. 3) and steam reforming of ethylene glycol [SREG] (Eq. 4) as a feedstock.

$$CH_3CH_2OH + H_2O \rightarrow 6H_2 + 2CO_2 \quad (Eq. 1)$$

$$C_3H_8O_3 + 3H_2O \rightarrow 7H_2 + 3CO_2 \quad (Eq. 2)$$

$$C_4H_9OH + 7H_2O \rightarrow 12H_2 + 4CO_2 \quad (Eq. 3)$$

$$C_2H_6O_2 + 2H_2O \rightarrow 5H_2 + 2CO_2 \quad (Eq. 4)$$

The overall reaction of eq. (1-4) involving above said bio-based feedstock, involves several steps such as dehydrogenation and/or dehydration, which produce acetaldehyde or ethylene as an intermediate product, respectively. Decarbonylation of these intermediates generate hydrogen, together with methane and carbon monoxide (Coke).

There are numerous catalysts developed for steam reforming of ethanol, glycerol, n-butanol and ethylene glycol reported over noble metals (Pt, Pd, Rh, Ru), non-noble metals (Ir, Cu, Co, Ni) with different supports like metal oxides, mixed metal oxides, hydrotalcite, spinel and perovskite catalysts as summarized at a glance in Table 1.

TABLE 1

Literature review at a glance for Steam reforming of Ethanol: conversion and hydrogen selectivity of catalysts.

| Catalyst | | Reaction Condition | | Ethanol Conversion | Hydrogen selectivity | |
|---|---|---|---|---|---|---|
| Metal load (%) | Support | S/E | Temp(K.) | (%) | (%) | References |
| Noble | | 3 | 1073 | 100 | 96 | (Liguras et al, 2003) |
| Rh (2) | $\gamma$-$Al_2O_3$ | | | | | |
| Rh (3) | MgO | 8.5 | 923 | 99 | 91 | (Cavallaro et al, 2003) |
| Rh (1) | $CeO_2$ | 3 | 723 | Above 90 | 82 | (Frusteri et al, 2004) |
| Rh (2) | $CeO_2$ | 8 | 723 | 100 | 69 | (Erdohelyi et al, 2006) |
| Rh (2) | $ZrO_2$ | 8 | 723 | 100 | 70.3 | (Diagne et al, 2004) |
| Rh (2) | $CeO_2$—$ZrO_2$ (Ce/Zr = 1) | 8 | 723 | 100 | 70.3 | (Diagne et al, 2002) |
| Ru (5) | $\gamma$-$Al_2O_3$ | 3 | 1073 | 100 | 96 | (Liguras et al, 2003) |
| Ru (1) | $CeO_2$ | 3 | 723 | Above 90 | 57 | (Erdohelyi et al, 2006) |
| Pt (2.5) Ru (1) | $\gamma$-$Al_2O_3$ | 10 | 823 | 100 | 100 | (Koh et al, 2008) |
| Pt (1) | $\gamma$-$Al_2O_3$ | 3 | 1073 | 100 | 96 | (Liguras et al, 2003) |
| Pt (0.5) | $\gamma$-$Al_2O_3$ | 4 | 613 | 95 | 40 | (Basagiannis et al, 2008) |
| Pt (1) | $CeO_2$ | 3 | 573 | 100 | 39 | (Ciambelli et al, 2010) |
| Pt (1.5) | $CeO_2$—$ZrO_2$ (Ce/Zr = 4) | 10 | 823 | 100 | 88 | (Chen et al, 2008) |
| Pd (1) | $\gamma$-$Al_2O_3$ | 3 | 1073 | 55 | 50 | (Liguras et al, 2003) |

TABLE 1-continued

Literature review at a glance for Steam reforming of Ethanol: conversion and hydrogen selectivity of catalysts.

| Catalyst Metal load (%) | Support | Reaction Condition S/E | Temp(K.) | Ethanol Conversion (%) | Hydrogen selectivity (%) | References |
|---|---|---|---|---|---|---|
| Pd (5) | γ-$Al_2O_3$ | 3 | 923 | 100 | 95 | (Goula et al, 2004) |
| $Rh_6Pt_2$ | $La_2O_3$ | 7 | 973 | 100 | 78 | (Cobo et al, 2013) |
| Ru | $CeO_2$/YSZ | 5 | 853 | 100 | 86.6 | (Ramos et al, 2012) |
| Non noble | | | | | | |
| Ni (7) | $SiO_2$ | 3.7 | 873 | 97.1 | 82.6 | (Calles et al, 2010) |
| Ni/Ce (7/10) | | | | 100 | 84.4 | |
| Ni/Zr (7/10) | | | | 100 | 82.5 | |
| Cu(2) Ni (7) Mg (10) | $SiO_2$ | 7.4 | 873 | 100 | 84.8 | (Carrero et al, 2010) |
| Co (1) | $V_2O_5$ | 13 | 723 | 100 | 53.5 | (Llorca et al, 2002) |
| | ZnO | | | 100 | 71.3 | |
| | $La_2O_3$ | | | 85 | 63.1 | |
| | $CeO_2$ | | | 93.7 | 69.6 | |
| | $Sm_2O_3$ | | | 85.9 | 64.7 | |
| ZnO (30) | $SiO_2$ | 12 | 773 | 91.8 | 57.0 | (Seker, 2008) |
| ZnO (50) | $SiO_2$ | | | 92.0 | 51.4 | |
| ZnO (70) | $SiO_2$ | | | 92.3 | 61.0 | |
| ZnO | — | | | 91.7 | 58.6 | |
| Ir (2) | $CeO_2$ | 3.2 | 923 | 100 | 75 | (Zhang et al, 2008) |
| Ir (2) | $Ce_{0.9}Pr_{0.1}O_2$ | 3 | 773 | 100 | 72 | (Wang et al, 2011) |
| Co (52)(molar ratio) | Zn = 18 Al = 30 | 3 | 823 | 100 | 83 | (Busca et al, 2010) |
| Co(20) | $CeO_2$ | 3 | 873 | 100 | 66 | (Lovon et al, 2012) |
| Co | $CeO_2$—N | 5.5 | 693 | 100 | 92.6 | (Machocki et al, 2010) |
| | $ZrO_2$—N | | | | 85.0 | |
| | Ce/$ZrO_2$—N | | | | 91.9 | |
| | Ce/$ZrO_2$—M | | | | 91.5 | |
| Ni—Cu (3) | $ZrO_2$ | — | 873 | 100 | 84 | (Sharma et al, 2013) |
| Ni(4) Zr(6) | MCM-48 | 1 | 1023 | 95 | 85 | (Lee et al, 2013) |
| Ni(10) Ga(30) Mg(30) | Zeolite Y | 3 | 973 | 100 | 87 | (Kwak et al, 2011) |
| Hydrotalcite NiMg6 NiMg8 | — | 6 | 923 | 100 | 64.9 64.1 | (Li et al, 2010) |
| Co (10) | — | — | 923 | 100 | 71 | (Contreras et al, 2008) |
| NiFe 1 | — | 6 | 773 | 100 | 80 | (Abello et al, 2013) |
| Co/Mg/Al 1/2/1 | — | 4 | 773 | 100 | 69.5 | (Espinal et al, 2012) |
| $Zn_{0.58}Ni_{0.42}[Al_{0.44}Co_{0.56}]_2O$ Spinel | — | 6 | 823 | 100 | 90 | (Li et al, 2010) |
| $NiAl_2O_4$ Perovskite | — | 6 | 823 | 100 | 45 | (Muroyama et al, 2010) |

TABLE 1-continued

Literature review at a glance for Steam reforming of Ethanol: conversion and hydrogen selectivity of catalysts.

| Catalyst | | Reaction Condition | | Ethanol Conversion | Hydrogen selectivity | |
|---|---|---|---|---|---|---|
| Metal load (%) | Support | S/E | Temp(K.) | (%) | (%) | References |
| Cu/Ni/$La_2O_3$ | — | — | 563 | 100 | 37 | (Liu et al, 2013) |
| $LaNiO_3$ | — | 13 | 573 | 100 | 70 | (Lin et al, 2013) |
| Mixed metal oxides | | | | | | |
| $Pt_{0.5}Co_{10}$ | /ZnO | 4 | 598 | 100 | 73.2 | (Chiou et al, 2013) |

However, as reported in above table, besides some of the heterogeneous catalysts provides a conversion of ethanol reported as 100% and selectivity near to 90-99% depending upon type of support and loading of metal, the main drawback is that these catalysts (doped metals) can be deactivated due to sintering and majorly due to coke formation (side reaction in steam reforming process).

The literature provided by A. Carrero et. Al. in the publication of 'Effect of Mg and Ca addition on coke deposition over Cu—Ni/$SiO_2$ catalysts for ethanol steam reforming'. Wherein, it discloses that Mg- and Ca-promoted catalysts (Cu—Ni/SiO2 catalysts) favour the formation of defective carbon (i.e. reduction of coke from 50 to 20%), which is more reactive and thermodynamically easier to be removed during the ethanol steam reforming process. But, said articles fails to avoid the coke formation reaction (reduced upto 20%) which leads to difficulties in repetitive use of same catalyst for several cycles. Also, the reaction temperature is upto 600° C.

In available literature, the several catalyst-support systems ranging from various transition metals such as Ni, Cu and Co, noble metals such as Pt, Pd and Ru and various supports such as $Al_2O_3$, MgO, $CeO_2$, $ZrO_2$ hydrotalcite (HTc), and mixed metal oxides like $La_2O_3$—MgO (LMMO), $CeO_2$—MgO (CMMO) and $ZrO_2$—MgO (ZMMO) are reported. These catalysts and supports were chosen to ensure high $H_2$ production with good catalytic activity and stability, minimal by-products, no coke formation etc. Although, these synthesized catalysts were able to achieve these features for steam reforming of above model compounds viz., ethanol, glycerol, n-butanol and ethylene glycol, but there was one aspect of limited cyclic stability and issues of metal sintering that hampered its long-term applicability by avoiding coke formation.

Therefore, the inventors of the present invention have developed a novel catalyst-support composition system for doping a transition as well as noble active metals for sustainable hydrogen production by steam reforming process using bio-based feedstock, wherein problem of cyclic stability, issues of metal sintering and coke deposition has been solved.

The said catalyst and improved catalyst-support system is comprising of combination of crystalline Mesoporous cellular foam (MCF) silica and $O^{2-}$ Lewis basic sites of MgO, $La_2O_3$ and $CeO_2$ (2:3 mole ratio) at once assistant for enhancing catalytic activity of active metals and total inhibition of coke formation, as it is surprisingly found in present invention that the besides active metal loading, catalyst support plays an important role to transformed the reaction scheme instead forming carbon monoxide to carbon dioxide, wherein the carbon monoxide generated in aforementioned dehydrogenation and/or dehydration can be transformed into maximum production carbon dioxide, and generating no coke formation and more hydrogen formation.

Hence, the present invention provides a steam reforming catalyst for various bio-oxygenates viz., ethanol, glycerol, n-butanol, and ethylene glycol over Ni-M, a Metal selected from Cu, Co, Pt and supported on combination of Mesoporous cellular foam (MCF) silica and metal oxide having $O^{2-}$ Lewis basic sites of MgO, $La_2O_3$ and $CeO_2$ i.e. support is MCF-S (MgO, $La_2O_3$, $CeO_2$) having more selectivity and stability with no coke formation, improves cyclic stability and avoided metal sintering effect. Therefore, the present invention of catalysts along with specific support is developed to ensure high $H_2$ production with good catalytic activity and more cyclic stability, minimal by-products, no coke formation.

OBJECTIVES OF THE INVENTION

The primary objective of the present invention aims to develop a metal doped active catalyst for steam reforming process for production of sustainable hydrogen from bio-based feedstock such as ethanol, glycerol, n-butanol and ethylene glycol.

One more objective of the present invention to provide a novel catalyst-support system for sustainable hydrogen production by steam reforming process using ethanol, glycerol, n-butanol and ethylene glycol as a feedstock.

Yet one more objective of the present invention is to provide an improved supported catalyst comprising of combination of crystalline Mesoporous cellular foam (MCF) silica and $O^{2-}$ Lewis basic sites of MgO, $La_2O_3$ and $CeO_2$ (2:3 mole ratio) at once for better efficiency. Next, the issues of lower cyclic stability, catalyst deactivation by sintering, weak metal-support interaction and inhibition of coke formation are addressed by the corresponding MCF silica-based modified catalysts viz., Cu—Ni—Co/MCF-MgO for steam reforming (SR) of ethanol, Ni—Cu/MCF-$La_2O_3$ for SR of glycerol, Pt—Ni—Cu/MCF-$La_2O_3$ for SR of n-butanol and Ni—Cu/MCF-$CeO_2$ for SR of ethylene glycol.

One more objective of the present invention to provide a process for preparation of a novel catalyst-support system for sustainable hydrogen production by steam reforming process using ethanol, glycerol, n-butanol and ethylene glycol as a feedstock.

Another objective of the present invention is providing a process for hydrogen production using a steam reforming of ethanol, glycerol, n-butanol and ethylene glycol in presence of novel catalyst, wherein a said catalyst is efficiently providing a high reactant conversion at lower temperature, no coke formation, high thermal stability for longer time and effective catalytic performance for multiple cycles.

SUMMARY OF THE INVENTION

The present invention provides a novel catalyst-support composition system for sustainable hydrogen production by steam reforming process using bio-based materials feedstock such as ethanol, glycerol, n-butanol and ethylene glycol. The said improved supported catalyst and metal doped catalysts therefrom, are comprising of combination of crystalline Mesoporous cellular foam (MCF) silica and basic site assistant for enhancing catalytic activity of doped active metals thereon and offers lower coke formation.

Accordingly, a steam reforming catalyst for sustainable hydrogen production using bio-based feedstock selected from ethanol, Glycerol, n-Butanol and Ethylene Glycol comprising of:

A support having combination of Mesoporous cellular foam silica and basic Metal oxides, At least two active metals doped on support having activity for steam reforming process;

Characterized in that the catalyst is having Surface area between 300 to 600 (m$^2$/g), Pore volume between pore diameter between 0.5 to 2.3 (cm$^3$/g) and Average Pore diameter between 9.0 to 18 nm.

Wherein combination of Mesoporous cellular foam silica and basic Metal oxide is selected from 2:3 mole ratio and basic Metal oxides are selected from Magnesium oxide, Cerium oxide and Lanthanum oxide.

The active metals having activity for steam reforming process are selected from Nickel, Cobalt, Copper and platinum or combination thereof having concentration ranging from 2.5 to 30 wt % total weight of support.

In accordance to present invention, the catalyst is having a support of combination of Mesoporous cellular foam silica:magnesium oxide in 2:3 mole ratio and doped with active metals Nickel 10 wt %, Cobalt 10 wt % and Copper 5 wt % of the total weight of support for steam reforming of ethanol (SRE) In accordance to one embodiment of present invention, the catalyst is having a support of combination of Mesoporous cellular foam silica:lanthenium oxide in 2:3 mole ratio and doped with active metals Nickel 10 wt % and Copper 10 wt % of total weight of support for steam reforming of glycerol (SRG).

Further, an embodiment of present invention, the catalyst is having a support of combination of Mesoporous cellular foam silica:lanthenium oxide in 2:3 mole ratio and doped with active metals Nickel 10 wt %, Copper 10 wt % and Platinum 2.5 wt % of total weight of support for steam reforming of n-butanol (SRB).

And in an additional embodiment of the present invention, the catalyst is having a of combination of Mesoporous cellular foam silica:cerium oxide in 2:3 mole ratio and doped with active metals Nickel 10 wt % and Copper 10 wt % of total weight of support for steam reforming of ethylene glycol (SREG).

The benefits of present invention are in the cost efficient steam reforming process for hydrogen production, wherein the said catalysts are efficiently providing a high reactant conversion at lower temperature, no coke formation, high thermal stability for longer time and effective catalytic performance for multiple cycles.

BRIEF DESCRIPTION OF DRAWINGS

For a more complete understanding of the features and advantages of the present invention, reference is now made to the detailed description of the invention along with the accompanying figures and in which:

FIG. 1—Depict SEM micrographs of fresh catalysts with conventional support: [(a) MCF (24 h); (b) MCF (48 h); (c) MCF (72 h); (d) Ni—Cu/MCF (24 h); (e) Ni—Cu/MCF (48 h); (f) Ni—Cu/MCF (72 h)].

FIG. 2—Depict SEM micrographs of fresh catalysts as per present invention: [(g) Cu—Ni—Co/MCF-MgO; (h) Ni—Cu/MCF-La$_2$O$_3$; (i) Pt—Ni—Cu/MCF-La$_2$O$_3$; (j) Ni—Cu/MCF-CeO$_2$].

FIG. 3—Depict SEM micrographs of used catalysts developed as per present invention (post cyclic tests): [(a) Ni—Cu/MCF (72 h); (b) Cu—Ni—Co/MCF-MgO; (c) Ni—Cu/MCF-La$_2$O$_3$; (d) Pt—Ni—Cu/MCF-La$_2$O$_3$; (e) Ni—Cu/MCF-CeO$_2$].

FIG. 4—Depict XRD profile of all catalysts developed as per present invention [fresh and used (post cyclic tests)].

FIG. 5—Depict TGA analysis of conventional catalysts: Ni—Cu/MCF (72 h).

FIG. 6—Depict TGA analysis of novel catalysts as per present invention): (a) Cu—Ni—Co/MCF-MgO; (b) Ni—Cu/MCF-La$_2$O$_3$; (c) Pt—Ni—Cu/MCF-La$_2$O$_3$; (d) Ni—Cu/MCF-CeO$_2$.

FIG. 7—Illustrates (a) an Effect of aging time on conventional support catalyst Ni—Cu/MCF when feedstock is ethanol and (b) Conversion rate of all bio-based feedstock compounds v/s temperature using conventional support catalyst Ni—Cu/MCF as per example 4.

FIG. 8—Illustrates (a) a H$_2$ yield at different temperatures using conventional support catalyst Ni—Cu/MCF for all bio-based feedstock compounds, (b) a Cyclic stability tests for bio-based feedstock compounds using conventional support catalyst Ni—Cu/MCF as per example 4.

FIG. 9—Illustrates a result for Steam Reforming of Ethanol performed as per example 5 using catalyst Cu—Ni—Co/MCF-MgO; (a) Conversion of ethanol v/s temperature (b) H$_2$ yield at different temperatures: (c) Cyclic stability tests.

FIG. 10—Illustrates a results for Steam Reforming of Glycerol as per example 5 using catalyst Ni—Cu/MCF-LMMO; (a) Conversion of glycerol v/s temperature; (b) H$_2$ yield at different temperatures; (c) Cyclic stability tests.

FIG. 11—Illustrates a results for Steam Reforming of n-Butanol as per example 5 using catalyst Pt—Ni—Cu/MCF-LMMO: (a) Conversion of n-butanol v/s temperature; (b) H$_2$ yield at different temperatures; (c) Cyclic stability tests.

FIG. 12—Illustrates a results for Steam Reforming of Ethylene Glycol as per example 5 using catalyst Ni—Cu/MCF-CMMO: (a) Conversion of EG v/s temperature; (b) H$_2$ yield at different temperatures; (c) Cyclic stability tests.

DETAILED DESCRIPTION OF THE INVENTION

There is continuous need in the refinery industry for improved catalyst support and active metals catalysts supported therefrom, which exhibiting a desirable balance of morphological properties which providing an enhanced catalytic activity, product selectivity and improved catalyst life by protecting the doped metals on said support.

In hydrogen production from ethanol by Steam reforming catalyst comprising a noble and/or transition active metals on metal oxides are known for loss of catalyst activity, because of deposition of coke formation on the catalyst bed, and sintering of active noble metals.

In general, it has been desirable to design a crystalline catalyst support so that it exhibits the highest surface area in order to provide the maximum concentration of catalytic sites and activity. However, in steam reforming process there is always a drop in catalyst textural properties owing to deposition of carbon nanotubes over the catalyst surface (doped metals), ultimately blocks its pores, leading the deactivation of whole catalyst after single use.

To solve the above said problem, the present invention provides a steam reforming catalyst for sustainable hydrogen production using bio-based feedstock selected from ethanol, Glycerol, n-Butanol and Ethylene Glycol, the catalyst composition comprising of a support having combination of Mesoporous cellular foam silica and basic Metal oxides, at least two active metals selected form any combination of copper, Nickel, platinum and cobalt; Characterized in that the catalyst is having Surface area between 300 to 600 ($m^2$/g), Pore volume between pore diameter between 0.5 to 2.3 ($cm^3$/g) and Average Pore diameter between 9.0 to 18 nm.

In an embodiment of present invention, a catalyst support prepared by combination of Mesoporous cellular foam (MCF) silica and $O^{2-}$ Lewis basic sites of MgO, $La_2O_3$ and $CeO_2$ (2:3 mole ratio) which is at the same time has small crystallite sizes lead to very high internal surface area and porosity thereby making them excellent supports for catalysts by providing faster reactant and product diffusion with basic sites assists for enhancing catalytic activity and complete inhibition of coke deposition, particularly providing a synergistic effect in overall steam reforming process.

According to the first embodiment, the present invention provides a steam reforming catalyst for bio based feedstock viz., ethanol, glycerol, n-butanol and ethylene glycol, the said catalyst is comprises of combination of mesoporous cellular foam silica-basic metal oxide in 2:3 mole ratio as a support and said support doped with at least two active metals in percentage between 2.5 to 30 wt %. The active metal catalyst for doping on said improved support can be selected from and not limiting to a combination of copper, Nickel, platinum and cobalt.

The general formula for Catalyst as per present invention is depicted as follows:

Ni-M-MCF-S

Wherein, 'Ni' is nickel,
'M' is metal selected from copper, platinum and cobalt;
'MCF' is mesoporous cellular foam silica
'S' is metal oxide selected from MgO, $La_2O_3$ and $CeO_2$.

In accordance an embodiment, the combination of mesoporous cellular foam silica and basic metal oxide is selected from 2:3 mole ratio.

In accordance to one of the embodiment, the percentage of said metals in said novel composition is ranging from 2.5 to 30 wt % on basis of total weight of modified support combination.

In accordance to one more embodiment, the catalyst is having Surface area between 300 to 600 ($m^2$/g), Pore volume between 0.5 to 2.3 ($cm^3$/g) and Average Pore diameter between 9.0 to 18 nm.

Therefore, the present invention provides a novel catalyst-support composition viz., Cu—Ni—Co/MCF-MgO for steam reforming of ethanol (SRE);
Ni—Cu/MCF-$La_2O_3$ for steam reforming of glycerol (SRG);
Pt—Ni—Cu/MCF-$La_2O_3$ for steam reforming of n-butanol (SRB) and
Ni—Cu/MCF-$CeO_2$ for steam reforming of ethylene glycol (SREG);

which efficiently provide a high reactant conversion at lower temperature, no coke formation, high thermal stability for longer time and effective catalytic performance for multiple cycles.

One aspect of present invention and in order to have a satisfactory catalytic stability and metal dispersion, selection of a suitable support is essential. The selection of an effective support relies on the fact that it should assist in attaining a fine dispersion of active particles and to avoid the aggregation. In addition, high active metals dispersion over the support with large pore size is necessary for better catalytic performance since the activity is greatly dependent on the accessibility to the active centres. As it is well known that higher pore sizes assist in diffusion of the reactants and products in the system. Over the years, a number of amorphous oxides, such as γ-$Al_2O_3$, $SiO_2$ have been employed as effective supports that are porous in nature. $Al_2O_3$ is one such suitable option since it possesses chemical and physical stability along with high mechanical resistance. Apart from this, $SiO_2$ has the advantage of high thermal resistance and high surface area whereas Zeolites are employed for their morphological characteristics as effective microporous properties. Recently, MCM-41 and SBA-15, mesoporous molecular sieves, are potential candidates owing to their huge surface area and uniformity in pores size. Several pores that are cylindrical in shape between 1.5 and 5 nm diameters are present in MCM-41. In case of SBA-15 it has uniform channels that are hexagonal in shape with diameter in the range from 5 to 30 nm and also has higher hydrothermal stability than MCM-4. Unfortunately, the pore diameters are small for both these supports thereby does not allow passage of big heavy molecules like tars etc. In addition, sintering of metallic Ni sintering takes place which blocks all pores thereby has low hydrothermal stability.

Mesoporous cellular foam (MCF) silica, a most encouraging material to overcome the drawbacks related with minute pores composed of uniform spherical cells with extremely large pores (pore diameter up to 50 nm) having narrow size distribution. Their small crystallite sizes lead to very high internal surface area and porosity thereby making them excellent supports for catalysts by providing faster reactant and product diffusion. Thus mass transfer limitations are also avoided in several reactions. Further these supports are known to increase metal dispersion of catalyst, avoid particle size growth and improve overall catalytic performance. They also are known to control metal sintering and increase resistance to thermal sintering by possessing the 'confinement effect. Over the years, MCF has been widely used as an effective catalyst support for a number of reactions and applications such as cellulose pyrolysis, tar cracking, steam reforming of model compounds like methane, methanol, and ethanol etc. In all applications, MCF based catalysts have been successful to report very high reactant conversion, no coke formation, high thermal stability and effective catalytic performance.

In addition, it was reported in our previous work that presence of basic sites assists in enhancing catalytic activity and lower coke deposition. As reported widely in literature, several studies relating to nickel catalysts supported on basic metal oxides such as MgO, CaO, $ZrO_2$, $CeO_2$, $La_2O_3$ is done. As previously suggested, that Lewis basic sites result in favorable chemisorption of $CO_2$ thereby avoiding CO development and no coke formation. Furthermore, the highest concentrations of active lattice oxygen vacancies in such catalysts also minimizes coke deposition and results in longer catalyst life. Therefore, both 3D mesoporous structure of MCF and basic metal oxides can be prepared in combination with each other and used as supports to stabilize active nanoparticles in the final catalysts.

In the present study, novel type of mesoporous materials MCF-M (MgO, $La_2O_3$, $CeO_2$) for supporting catalytically active transition and noble metals (Ni, Cu, Co, Pt) were prepared by suitable surface alteration of MCF silica utilizing its mesoporous nature and basicity of MgO, $La_2O_3$, $CeO_2$ at the same time. MCF silica with different mesostructure features have been developed at several aging times (24, 48 and 72 h) by typical hydrothermal technique. Thus, the optimum MCF support can be obtained for a catalyst with highest porosity. The integration of active metals in the MCF matrix has been performed out using deposition co-precipitation method. In this work, the selection of the best catalyst-support system from each steam reforming scheme of various bio-based model compounds reported earlier and these catalytic systems were modified by addition of MCF along with their respective supports (2:3 mole ratio, respectively) whilst maintaining the reforming catalyst intact i.e. Cu—Ni—Co/MCF-MgO for steam reforming of ethanol (SRE), Ni—Cu/MCF-$La_2O_3$ for steam reforming of glycerol (SRG), Pt—Ni—Cu/MCF-$La_2O_3$ for steam reforming of n-butanol (SRB) and Ni—Cu/MCF-$CeO_2$ for steam reforming of Ethylene Glycol (EG). The efficacy of MCF as support for long-term $H_2$ production via steam reforming of above model bio-oxygenates was evaluated. For comparison purposes, only Ni—Cu/MCF catalyst without combining it with any basic support was studied. Till date, such integration of catalyst and support system for sustainable hydrogen synthesis has not been tried.

The present invention is further described with the help of the following examples, which are given by way of illustration.

EXAMPLES

Example 1: Synthesis of Mesostructured Cellular Foam (MCF) Silica Having Surface Area Between 500 to 550 $m^2/g$, Pore Volume Between 3.0 to 3.5 $cm^3/g$ and Pore Diameter Between 20 to 25 nm by Hydrothermal Technique MCF is synthesized by a well reported hydrothermal technique. Here, appropriate amount of the triblock co-polymer P123 was dissolved in 37 (w/w) % HCl and further the solution was dissolved in de-ionized water. The dissolved acidic polymer solution was then subjected to the addition of mesitylene under constant stirring and at 313 K. Post 2 h of rigorous stirring, tetraethoxysilane was added under continuous stirring for 1 h and later this solution was kept for aging at 313 K for 20 h. This aging is essential for the hydrolysis of tetraethoxysilane. Post aging, appropriate amounts of dissolved ammonium fluoride in de-ionized water was added to the solution and stirred for about 30 minutes. Next, the solution was kept under aging time between 70 to 75 h at 373 K. After completion of ageing, resulting solutions was given water and ethanol wash to get rid of acid and polymer. Finally, the material was dried at 393 K for 12 h and calcined at 873 K for 6 h in air atmosphere. If the aging time is reduced to 24 hr or 48 hr, it affects the porosity value of MCF as mentioned in following Table.

TABLE 2

BET surface area and porosity (before cyclic tests).

| Material | Surface area ($m^2/g$) | Pore volume ($cm^3/g$) | Average Pore diameter (nm) |
|---|---|---|---|
| MCF (24 h) | 609 | 2.3 | 18.1 |
| MCF (48 h) | 557 | 2.8 | 20.7 |
| MCF (72 h) | 520 | 3.3 | 22.2 |

Example 2: Preparation of Conventional Ni—Cu/MCF Catalyst by Combination of Hydrothermal as Well as Incipient Wetness Impregnation Technique The conventional Ni—Cu/MCF catalyst was prepared by hydrothermal as well as incipient wetness impregnation technique. Preparation of the support material i.e. MCF silica (72 h) was carried as per example no. 1. An aqueous solution of nickel and copper nitrates were utilized for the incipient wetness impregnation of nickel and copper (10 wt % each) over a aqueous solution of MCF silica supports. In this method, impregnation was performed under continuous stirring of the solution for 24 h for complete pore filling of MCF silica supports. The addition was stopped on formation of sticky solid material. It was the time when the volume of adsorbed solution was the same as the pore volume of the support. Once the impregnation was complete and loading of 20 wt % achieved, the material was dried at 383 K for 12 h and further calcined at 773 K for 3 h under air atmosphere. The calcined catalysts were further pressed, crushed and sieved to granules having size of 0.08-0.35 mm to get the required catalyst.

Example 3: Preparation of Novel Catalyst-Support System Having General Formula 'Ni-M-MCF-S' as Per Present Invention Four novel catalyst composition systems were prepared by active metal loadings on combination of support (MCF-Metal oxide in 2:3 molar ratio) as per present invention i.e. combination of mesostructured cellular foam (MCF) silica (72 h) and Basic Metal Oxides (MgO, $La_2O_3$, $CeO_2$) by combination of hydrothermal as well as deposition co-precipitation technique:

The MCF prepared in example no. 1 and suitable metal precursor selected from Nitrates of Mg, $La_2$ or Ce was mixed in a water in 2:3 molar ratio. Further, added aqueous solution of active metal (Copper, Nickel, Cobalt and platinum) were drop wise added in the said reaction mixture.

This technique enables equal distribution of active metals in the support matrix. Simultaneously, the dropwise addition of urea and two molar sodium hydroxide solution were used for precipitation purposes and maintaining the pH of the solution (9-10), respectively.

When the pH is raised (9-10), the ammonium hydroxide concentration is also higher, which results in the attraction of metal hydroxide and OH⁻ ions via hydrogen bonding. Post precipitation of solution for 24 h, filtration, and washing with de-ionized water was done several times. Further, washed material was dried at 393 K, grounded to a fine powder, and calcined at 973 K for 5 h under air atmosphere. Post calcination, the catalysts were pressed, crushed, and sieved to granules having a size of 0.08-0.35 mm.

The resulting materials were named as:
1) Cu—Ni—Co/MCF-MgO catalyst for SRE,
2) Ni—Cu/MCF-La$_2$O$_3$ catalyst for SRG,
3) Pt—Ni—Cu/MCF-La$_2$O$_3$ catalyst for SRB, and
4) Ni—Cu/MCF-CeO$_2$ catalyst for SREG.

For all four catalysts, Ni and Cu are common active metals. Apart from that, Co (10 wt. %) in SRE and Pt (2.5 wt. %) in SRB are two additional active metals are present. In this novel preparation technique, Ni (10 wt. %) and Cu (10 wt. %) as well as Co (10 wt. %) in SRE and Pt (2.5 wt. %) in SRB nitrate solutions were added drop by drop to the aqueous solution of MCF silica (72 h) under continuous stirring at 363 K.

nature exhibited due to the addition of MCF silica with high surface area and porosity. All active MCF based catalysts had average pore sizes greater than 10 nm. Our outcomes are in accordance with BET results (Table 5). Thus, these catalysts are ideal for reactions with bulky molecules.

The structures in the used catalysts [FIG. 3 (b-e)] were similar to the fresh catalysts however the sizes of the metallic nanoparticle in the used catalysts were higher than fresh catalysts. As well as, mesoporous structures in the used catalysts were nearly lost for all synthesized catalysts. In the case of used Ni—Cu/MCF (72 h) catalyst (FIG. 2a), apart from increase in metal particle sizes, coke formation was also observed in terms carbon nanotubes. No other used catalysts has shown coke formation post cyclic tests besides catalyst used MCF silica as only support. EDX results ratify the existence of all metals in the respective samples (Table 3). For all cases, the Ni was maintained to be 10 wt %. In addition to this, the second transition metal, Co (SRE) and

TABLE 3

EDX data for prepared catalysts.

| Catalyst | Ni (wt %) | Cu (wt %) | La (wt %) | Co (wt %) | Ce (wt %) | Pt (wt %) | Mg (wt %) | MCF (wt %) | O (wt %) |
|---|---|---|---|---|---|---|---|---|---|
| Ni—Cu/MCF | 11.2 | 10.2 | — | — | — | — | — | 15.1 | 63.5 |
| Cu—Ni—Co/MCF-MgO | 10.1 | 4.6 | — | 9.3 | — | — | 43.3 | 14.1 | 18.6 |
| Ni—Cu/MCF-La$_2$O$_3$ | 10.8 | 9.9 | 44.5 | — | — | — | — | 15.1 | 19.7 |
| Pt—Ni—Cu/MCF-La$_2$O$_3$ | 11.1 | 10.4 | 41.7 | — | — | 2.6 | — | 14.1 | 20.1 |
| Ni—Cu/MCF-CeO$_2$ | 10.2 | 10.9 | — | — | 43.7 | — | — | 15.4 | 19.8 |

Characterization of Catalysts Prepared in Example No. 2 and 3:

The synthesized materials were characterized by analytical techniques mentioned below:

1. SEM: SEM images of MCF silica (24, 48, 72 h) and Ni—Cu/MCF (24, 48, 72 h) fresh catalysts are shown in FIG. 1 (a-f). SEM images of these catalysts clearly depict spherical shape particles with Ni and Cu particles in size range of 10-20 nm which indicate the mesoporous nature of the catalysts. As seen from the FIG. 1(c), particle size of MCF silica prepared with ageing time of 72 h are slightly lower than particle size of MCF silica aged at 24 and 48 h [FIGS. 1(a) and (b), respectively]. FIG. 1 (d-f) clearly depict deposition of Ni and Cu as active metals on surface of MCF silica (24, 48, and 72 h). As one can clearly see from the images of Ni—Cu/MCF (24, 48, 72 h) catalysts, the morphology of MCF silica particles has changed with Ni and Cu loadings. Ni—Cu/MCF (72 h) catalyst [FIG. 1 (f)] showed proper dispersion of active metals on the surface of MCF silica with no major changes in its morphology as compared to MCF silica (72 h) [FIG. 1 (c)]. Other two catalysts viz., Ni—Cu/MCF (24 and 48 h) [FIGS. 1 (d) and 1A (e), respectively] showed significant changes in their morphologies after loading of Ni and Cu. This is because of MCF silica aged at 72 h has highest pore diameter (22.2 nm) (Table 5) than MCF silica aged at 48 and 72 h which results in Ni and Cu nanoparticles were uniformly incorporated into the MCF silica (72 h) matrix and evenly distributed on its surface. Nonetheless, all the catalysts show highly porous Cu (SRG, SRB and SREG) was also taken as 10 wt %. In the case of SRE, Cu was used as a promoter (5 wt %) whereas the noble metal promotion, Pt in SRB was maintained to be 2.5 wt %. Further, the ratio of MCF to basic support was kept 2:3 so as to have a higher basicity and enhanced oxygen vacancies to suppress or eliminate coke formation in the material. 2. XRD: XRD diffractograms for the fresh and used catalysts are shown in FIG. 3. For XRD of all fresh samples, the patterns clearly depict the diffraction peaks corresponding to NiO, CuO, CoO and PtO$_2$ around 2θ=43°, 62° and 73°, 2θ=32° and 49°, 2θ=48° and 74° and 2θ=34.8°, respectively as expected from previous reports. The basic supports were evident from the peaks of MgO, La$_2$O$_3$, La$_2$O$_2$CO$_3$ and CeO$_2$ in their respective positions around 2θ=34°, 2θ=38° and 49°, 2θ=24° and 2θ=35°, respectively as previously reported. Further, the presence of SiO$_2$ in the form of MCF was evident at peak around 2θ=25° for all the catalysts. The typical peaks of crystalline NiO and CuO for Ni—Cu/MCF (72 h) catalyst are not clearly visible, showing great metal dispersion of the NiO and CuO species on the MCF (72 h) silica support owing to its mesoporous nature and high porosity. As opposed to Ni—Cu/MCF (72 h) catalyst, the nickel and copper particle size in their oxide forms were reduced with the loading of MCF-S (MgO, La$_2$O$_3$, CeO$_2$). It means that a suitable amount of MCF:S (2:3 mole ratio) can be helpful for small crystallite sizes and stabilization of active particles. Such nanoparticle sizes result in higher metal dispersion and thus provide greater access to active sites. However, peaks at 2θ=65.3°, 62.2°, 73.6°, 57.8°, and 2θ=48.5°, 48.4°, 49.1°, 47.8° that are characteristics of nickel and copper phyllosilicates, which were decomposed after calcination into NiO and CuO, respectively, in all synthesized catalysts. With the phyllosilicate form, nickel and copper particles show high dispersion and strong contact between metal and support that considerably promotes reactant conversions and higher $H_2$ concentrations in the system. In the case of used catalysts, higher 2θ scale are seen due to presence of water vapour generated because of reverse water gas shift (RWGS) along with methanation reactions, which oxidized the metallic nickel ($Ni^0$) and copper ($Cu^0$) nanoparticles, so that they changed into nickel ($Ni^{2+}$) and copper ($Cu^{2+}$) ions which are phyllosilicate or in their oxide forms lead to increase in their crystallite sizes, known as metal sintering of metallic nanoparticles responsible for decreasing catalysts activity. The reused catalysts post cyclic stability tests report similar peaks with lesser intensity and a slight increase in sizes of crystals. The major advantage of MCF silica coupled with basic supports is that it avoids the growth of metal particles, thereby increasing its dispersion, which helps in resistance to metal sintering and increasing cyclic stability. Overall, Debye-Scherrer formulae were employed to ascertain the crystallite sizes (Table 4).

TABLE 4

XRD patterns of synthesized catalysts [fresh and used (post cyclic tests).

| Catalysts | Phase | 2θ position | Crystallite Size (nm) (Fresh) | Crystallite Size (nm) (Used) |
|---|---|---|---|---|
| Ethanol: Ni—Cu/MCF (24 h) | NiO | 43.1° | 27.1 | — |
| | CuO | 32.9° | 29.3 | |
| | MgO | 34.3° | 30.1 | |
| | MCF | 31.6° | 33.8 | |
| Ethanol: Ni—Cu/MCF (48 h) | NiO | 42.3° | 23.1 | — |
| | CuO | 33.3° | 27.1 | |
| | MgO | 35.3° | 26.7 | |
| | MCF | 34.7° | 29.2 | |
| Ethanol: Ni—Cu/MCF (72 h) | NiO | 43.6° | 16.7 | — |
| | CuO | 32.9° | 18.3 | |
| | MgO | 34.3° | 17.7 | |
| | MCF | 34.1° | 20.5 | |
| Ethanol: Cu—Ni—Co/MCF-MgO | NiO | 43.3° | 17.7 | 26.6 |
| | | 65.3° | 12.7 | 23.4 |
| | CuO | 32.7° | 19.2 | 27.1 |
| | | 48.5° | 16.6 | 25.2 |
| | CoO | 48.8° | 16.8 | 25.2 |
| | MgO | 74.2° | 10.9 | 20.4 |
| | | 32.3° | 18.7 | 33.1 |
| | MCF | 35.6° | 21.5 | 30.3 |
| Glycerol: Ni—Cu/MCF-La₂O₃ | NiO | 43.5° | 17.2 | 27.1 |
| | | 62.2° | 13.1 | 25.3 |
| | CuO | 39.5° | 18.1 | 25.1 |
| | | 48.4° | 16.1 | 29.8 |
| | La₂O₃ | 49.4° | 20.8 | 34.2 |
| | La₂O₂CO₃ | 24.5° | 13.5 | 27.2 |
| | MCF | 36.2° | 18.5 | 31.2 |
| Butanol: Pt—Ni—Cu/MCF-La₂O₃ | NiO | 43.1° | 16.1 | 28.3 |
| | | 73.6° | 13.5 | 23.1 |
| | CuO | 39.1° | 16.2 | 26.3 |
| | | 49.1° | 14.4 | 22.6 |
| | PtO₂ | 34.8° | 7.4 | 15.1 |
| | La₂O₃ | 38.9° | 20.2 | 37.2 |
| | La₂O₂CO₃ | 24.5° | 17.1 | 30.1 |
| | MCF | 30.2° | 16.2 | 32.9 |
| Ethylene Glycol: Ni—Cu/MCF-CeO₂ | NiO | 42.5° | 15.2 | 25.1 |
| | | 57.8° | 11.3 | 23.7 |
| | CuO | 38.6° | 14.1 | 28.4 |
| | | 47.8° | 12.1 | 25.3 |
| | CeO₂ | 33° | 24.5 | 41.3 |
| | | 35.4° | 22.3 | 40.1 |
| | MCF | 28.5° | 18.2 | 30.1 |

4. BET:

As seen from Table 5, the active surface area reduction from 609 to 557 cm²/g for MCF silica took place as the aging time rose from 24 to 48 h. Further, the total surface area somewhat reduced from 557 to 520 cm²/g as time of aging rose from 48 to 72 h. Such reduced behaviour is due to growth of window pore sizes along with denser framework walls formation. The rise in time of aging from 24 to 48 h also showed rise in total pore volume from 2.3 to 2.8 cm³/g. Next, rise in time of aging to 72 h also led to rise in the volume of pores to 3.3 cm³/g. The rise in pore size and total pore volume with increasing aging times could be attributed to the addition of swelling agent (TMB) which increases the window pore size during the aging step at 373 K. Here, the linkages of Si—O—Si along with silica condensation took place that led to higher pore sizes. The largest pore size (22.2 nm) was attained at 72 h aging time in the synthesis of MCF supports. Similar observations were also reported by previously that worked on the effects of acid concentration and time of aging in synthesis of MCF.

TABLE 5

BET surface area and porosity (before cyclic tests).

| Material | Surface area (m²/g) | Pore volume (cm³/g) | Average Pore diameter (nm) |
|---|---|---|---|
| MCF (24 h) | 609 | 2.3 | 18.1 |
| MCF (48 h) | 557 | 2.8 | 20.7 |
| MCF (72 h) | 520 | 3.3 | 22.2 |
| Ni—Cu/MCF (24 h) | 440 | 1.6 | 15.3 |
| Ni—Cu/MCF (48 h) | 403 | 1.9 | 16.8 |
| Ni—Cu/MCF (72 h) | 387 | 2.5 | 19.4 |
| Cu—Ni—Co/MCF—MgO | 268 | 0.9 | 10.1 |
| Ni—Cu/MCF-La₂O₃ | 362 | 1.6 | 15.2 |
| Pt—Ni—Cu/MCF-La₂O₃ | 311 | 1.2 | 11.5 |
| Ni—Cu/MCF-CeO₂ | 355 | 1.9 | 15.7 |

Next, the incorporation of Ni and Cu resulted in decrease in active surface area and porosity as seen from Table 4. Surface area, pore volume and pore diameter of Ni—Cu/MCF (24 h) catalyst decreased to 440 cm²/g, 1.6 cm³/g and 15.3 nm, respectively as compared to only MCF (24 h) silica as a support. Similar way, Ni—Cu/MCF (48 h) and Ni—Cu/MCF (72 h) catalysts also showed decrease in their textural properties in comparison with MCF silica (48 and 72 h), respectively. These changes occurred due to the silica dissolution during deposition co-precipitation of nickel and copper particles. As stated above that ageing times affect their textural properties which can be clearly seen from the results of Ni—Cu/MCF (72 h) catalyst. For Ni—Cu/MCF (72 h) catalyst, the pore volume and diameter was observed to be 2.5 cm³/g and 19.4 nm, respectively which are higher than Ni—Cu/MCF (24 and 48 h) catalysts however there is a reduction in surface area to 387 m²/g. The point to be noted here is, these porosity values of Ni—Cu/MCF (72 h) catalyst are better than MCF (24 h) silica alone in terms of porosity which again proves the importance of applying ageing time during MCF silica synthesis. Such high porous structure is important in SR reactions for providing better diffusion of reactants and products which overcome mass transfer limitations. Hence, our aim of producing catalysts with high porous structure via increasing ageing time from 24 to 72 h is justified.

TABLE 6

BET surface area and porosity (post cyclic tests).

| Material | Surface area (m²/g) | Pore volume (cm³/g) | Average Pore diameter (nm) |
|---|---|---|---|
| Ni—Cu/MCF (72 h) | 110 | 0.4 | 5.3 |
| Cu—Ni—Co/MCF—MgO | 192 | 0.7 | 8.9 |
| Ni—Cu/MCF-La$_2$O$_3$ | 314 | 1.1 | 9.7 |
| Pt—Ni—Cu/MCF-La$_2$O$_3$ | 261 | 0.9 | 9.1 |
| Ni—Cu/MCF-CeO$_2$ | 301 | 1.1 | 10.2 |

Table 6 demonstrates similar information for all fresh and used catalysts post cyclic tests. Since MCF (72 h) silica demonstrated better textural properties than MCF silica aged at 24 and 48 h, hereafter MCF (72 h) silica has been used as a support for further studies. The addition of active metals over the MCF support leads to reduction in surface area and porosity as expected. When MCF is combined with basic supports i.e. Ni—Cu/MCF-La$_2$O$_3$ and Ni—Cu/MCF-CeO$_2$ catalysts, reported highest surface area of 362 and 355 cm²/gm, respectively. The pore size and pore volume of Ni—Cu/MCF-CeO$_2$ and Ni—Cu/MCF-La$_2$O$_3$ catalysts were found to be 15.7 and 15.2 nm and 1.9 and 1.6 cm³/g, respectively which are highest than other MCF silica catalysts modified with basic supports. Cu—Ni—Co/MCF-MgO catalyst showed lowest surface area (268 cm²/gm), pore volume (0.9 cm³/g) and pore diameter (10.1 nm) in comparison with other synthesized catalysts, whereas Pt—Ni—Cu/MCF-La$_2$O$_3$ catalyst showed surface area of 311 cm²/gm along with moderate pore volume (1.2 cm³/g) and pore diameter (11.5 nm). In fact, this reduction in MCF silica indicates proper incorporation and good dispersion of active catalyst on its surface. Post cyclic tests, the reduction in surface area for all the catalysts is minimal except Ni—Cu/MCF (72 h) catalyst showed very less surface area (110.1 cm²/gm) and significant reduction in its pore volume (0.4 cm³/g) and pore diameter (5.3 nm). Such a drop in its textural properties is owing to carbon nanotubes over the catalyst surface, ultimately blocks its pores which is visible from SEM (FIG. 3-$a$). Nonetheless, all synthesized catalysts exhibited high surface area and porosity in comparison to earlier reported catalysts used without MCF as a support.

3. TGA: TGA investigation was executed on Netzsch-STA 449 449F3 1293-M apparatus employing Al$_2$O$_3$ containers.

As seen from the FIG. 5, Ni—Cu/MCF (72 h ageing time) catalyst depicted continuous weight loss up to 723 K. The major reduction in weight was observed at an endothermic peak between 673 and 723 K which was ascribed to the carbon nanotubes formation due to either methane decomposition or CO disproportionation which can be easily seen in both SEM [FIG. 3 ($a$)]

Wherein, spent catalysts post cyclic tests (10 cycles) a) Cu—Ni—Co/MCF-MgO, b) Ni—Cu/MCF-La$_2$O$_3$, c) Pt—Ni—Cu/MCF-La$_2$O$_3$ and d) Ni—Cu/MCF-CeO$_2$ (al172 h ageing time) [FIG. 6 (a, b, c, and d) for all four catalyst] are similar, which suggests no coke formation and remain stable owing to the formation of stable oxide form. There were majorly two types of carbonaceous species generated during SR as per the literature, carbon nanotubes, and the graphite carbon. Carbon nanotubes are less active carbonaceous species that can be avoided during the reaction by using oxygenated basic metal oxides in the catalyst and the graphite carbon that is generally accountable for the catalyst deactivation.

Example 4: Steam reforming studies using conventional catalyst support i.e. Ni—Cu/MCF (ageing time 24, 48 and 72 h) catalysts:

Catalyst is packed in steam reforming reactor as per known method and set the parameter.

Parameters for Steam Reforming: Reaction conditions: Catalyst—Ni—Cu/MCF (72 h), S/C—6, GHSV—3120 h$^{-1}$, P—0.1 MPa).

The role of MCF as the only support for the catalyst is explored by synthesizing Ni—Cu/MCF catalyst and testing the efficacy over the selected model compounds viz., ethanol, glycerol, n-butanol, and ethylene glycol. Here, we have selected Ni and Cu as an active metal in the catalyst since both metals are common amongst all previously reported catalysts by us and proved their roles when used as bimetal in such systems. The role of MCF silica as support is evaluated via reactant conversion, a yield of H$_2$, and cyclic resilience. In all studies, optimized reaction conditions for each compound have been employed to maintain uniformity.

As reported in the synthesis of MCF silica-based catalysts, the material was kept for three different aging times, 24, 48 and 72 h at 323 K. It is worthy of note that the aging behaviour affects the surface area and porosity as aging time progresses, which is clearly explained in the BET section. To evaluate this phenomenon, initially, we have selected the model compound ethanol and performed SR studies at 773 K. We plotted the conversions of ethanol over Ni—Cu/MCF catalysts prepared at altered aging times (24, 48 and 72 h). The results so obtained are shown in FIG. 7($a$). As observed, Ni—Cu/MCF (24 h) catalyst reported the least conversion (78%), whereas the same catalyst prepared at an aging time of 72 h reported the highest conversion (93%). Such results are obtained due to the window pore size, and pore volume in the MCF silica materials increases with aging times. The pore size and volume of MCF silica synthesized at an aging time of 72 h (MCF 72 h) was the maximum and window pore size of MCF (48 h) was greater than that of MCF (72 h), similarly window pore size (19.4 nm) and pore volume (2.5 cm³/g) of Ni—Cu/MCF (72 h) catalyst was reported highest compared to Ni—Cu/MCF (48 h) and Ni—Cu/MCF (24 h) catalysts which is 16.8 nm and 1.9 cm³/g and 15.3 nm and 1.6 cm³/g, respectively as depicted in Table 5. Here, all particles of Ni and Cu were simply integrated through the window pore size of MCF (72 h) support. Thus, the higher window pore size of MCF (72 h) support caused in the easier union of nickel and copper nanoparticles with lesser sizes. Therefore, appropriate support was essential for attaining a great dispersion of active metals with small sizes and high porous structures, thereby assisting in high reactant conversion. Thus, based on these results, we have selected the catalyst with MCF silica aging time of 72 h i.e., Ni—Cu/MCF (72 h) for further reforming studies on glycerol, n-butanol and ethylene glycol.

Now, the reactant conversion was plotted against temperature varying from 623 K to 773 K. As expected, the endothermic nature responsible for the high temperature of the SR reaction leads to greater conversion. The results so obtained are seen in FIG. 7 ($b$). All compounds reported very high conversion at 773 K. The point to be noted here is that presence of MCF silica drastically increases the reactant conversion (>90%) in comparison to other supports like MgO—Al$_2$O$_3$(HTc) for SRE (Shejale et al, 2017), La$_2$O$_3$—MgO (LaMMO) for SRG and SRB (Shejale et al, 2018), CeO$_2$—MgO (CeMMO and ZrMMO) for SREG (70-90%)

(Shejale et al, 2019) used previously. This enhancement is because of the increase in pore size and the surface area leading to improved access of reactants to active sites and ease of diffusion of products.

Next, we evaluated the role of MCF silica by plotting $H_2$ yield vs. temperature. The outcomes are depicted in FIG. 8(a). As seen from the results, the $H_2$ yield is on the lower side (60-70%) for all compounds in comparison to the above-mentioned supports used previously (Shejale et al, 2017, 2018 and 2019). The major reason behind lower yield of $H_2$ is since MCF is neutral support and other supports like HTc, LaMMO, and CeMMO, etc. are basic in nature, the latter assists in avoiding unwanted side reactions favor $H_2$ production and avoid coke formation.

Finally, to prove the long-term application of MCF silica, we performed cyclic stability studies of the catalyst. The outcomes for all compounds are presented in FIG. 8(b). Interestingly, all compounds reported very low stability (about 2-3 cycles) as opposed to the other basic supports. As well known, catalyst deactivation of the N—Cu/MCF (72) catalyst is owing to coke deposition (coking), owing to the decomposition of methane and CO dissociation reaction. Coke formation and $CH_4$ conversion are in reverse related, but bifurcation of CO further results in coke deposition if the conversion of $CH_4$ is high. As shown from the SEM of the Ni—Cu/MCF (72 h) spent catalyst [FIG. 3 (a)], nanotubes of carbon are seen. However, the residue of carbon over the Ni—Cu/MCF (72 h) catalyst was mainly nanotubes that are avoided by adsorbed $CO_2$ on oxygen vacancies of basic sites during the reaction. Accordingly, the large surface concentration of $O^{2-}$ Lewis basic sites on basic metal oxides surfaces confirms improved catalytic activity to the adsorption and activation of carbon dioxide. But the absence of highly active mobile oxygen vacancies and $O^{2-}$ Lewis basicity in MCF silica, when used as only support, lead to coke formation and thereby deactivate the catalyst. This behaviour is responsible for the very low cyclic stability of the Ni—Cu/MCF (72 h) catalyst. This is a significant disadvantage of using MCF silica as only support in comparison to other basic supports.

Thus, considering the above outcomes, we can state that the merger of MCF silica with basic supports like MgO for SRE, $La_2O_3$ for SRG and SRB and $CeO_2$ for SREG will combine the gains of both mesoporous structure of MCF silica and $O^{2-}$ Lewis basicity of above metal oxides [MCF-S (MgO, $La_2O_3$, $CeO_2$)] at the same time thereby leading to high $H_2$ production over a large number of cycles and preventing catalysts from deactivation.

Example 5: Steam reforming studies over Present invention supported Catalyst, i.e. Ni-M-MCF-S (MgO, $La_2O_3$, $CeO_2$) modified catalysts:

Parameters for Steam Reforming:

1) Reaction conditions for Ethanol Feed stock: Catalyst—Cu—Ni—Co/MCF-MgO, S/C—6, GHSV—3120 $h^{-1}$, P—0.1 MPa).

2) Reaction conditions for Glycerol Feed stock: Catalyst—Ni—Cu/MCF-$La_2O_3$, S/C—6, GHSV—3120 $h^{-1}$, P—0.1 MPa).

3) Reaction conditions for Butanol Feed stock: Catalyst—Pt—Ni—Cu/MCF-$La_2O_3$, S/C—6, GHSV—3120 $h^{-1}$, P—0.1 MPa).

4) Reaction conditions for Ethylene Glycol Feed stock: Catalyst—Ni—Cu/MCF-$CeO_2$, S/C—6, GHSV—3120 $h^{-1}$, P—0.1 MPa).

In order to take advantages of mesoporous silica material and basic properties of metal oxides in one material, Inventors fabricated different catalysts by merging MCF silica and the best catalyst from each reforming studies reported earlier as follows: SRE—Cu—Ni—Co/MCF-MgO; SRG—Ni—Cu/MCF-$La_2O_3$; SRB—Pt—Ni—Cu/MCF-$La_2O_3$ and SREG—Ni—Cu/MCF-$CeO_2$. The efficiency of all these catalysts were tested via reactant conversion, yield of $H_2$ and cyclic stability studies. FIG. 9 (a), 10 (a), 11 (a) and 12 (a) report the conversion of each reactant at different temperatures (623-773 K). The conversion pattern for all compounds was similar; wherein all catalysts reported higher conversions at higher temperatures owing to the typical endothermic reforming nature. All modified catalysts reported nearly complete reactant conversion values at 773 K. Particularly, Cu—Ni—Co/MCF-MgO catalyst for SRE (FIG. 24) and Pt—Ni—Cu/MCF-$La_2O_3$ catalyst for SRB (FIG. 26) exhibited the maximum conversions of 99% and 98%, respectively at 773 K. Similar results were also obtained for Ni—Cu/MCF-$CeO_2$ (SREG) (FIG. 12 (b)) and Ni—Cu/MCF-$La_2O_3$(SRG) (FIG. 10(b)) catalysts producing higher reactant conversions of 98% and 91%, respectively at the same temperature. The presence of MCF silica, along with the other basic supports, further assists in raising conversion values. MCF silica assists in increasing porosity values of the catalysts due to its three dimensional mesoporous structure whereas the basic supports diminish the risk of carbon deposition, and a synergistic interaction between them stabilizes active metals like Ni, Cu, Co and Pt in the catalysts which assist in C—C bond cleavage of the reactant for better conversion.

An efficient catalyst-support system is the one that reports high reactant conversion into the desired product. In our case, it is essential that all model bio-oxygenates get effectively converted to $H_2$. To evaluate this phenomenon, we conducted studies to calculate the $H_2$ yield at various temperatures [FIG. 09 (b), 10 (b), 11 (b) and 12 (b)]. As noted previously, optimized conditions of S/C and GHSV have been employed for the respective catalysts. As seen from the graphs, a significant increase in $H_2$ yield is observed at high temperatures than those reported previously, with only MCF silica used as support. $H_2$ yield for SRE [FIG. 09 (b)], SRG [FIG. 10 (b)], SRB [FIG. 11 (b)] and SREG [FIG. 12 (b)] were reported 89%, 85%, 86%, and 84%, respectively, by employing their respective catalysts mentioned above. As a well-known fact, MCF silica, in addition to increasing surface area, also assists in increasing the stability of the catalysts. The catalyst was synthesized such that a strong anchorage with the support is seen as evident from TEM and $H_2$-TPR graphs. This helps in maintaining the catalyst stability with intact structures, thereby assisting in better metal-support interaction. The basic support avoids unnecessary side reactions, which assist in higher $H_2$ production. Better access to active sites for longer durations with stable structures helps in better conversion of reactants to desired product, i.e., $H_2$.

The longevity of catalyst is a major criterion for the commercial applicability of any catalyst. One of the major reasons to employ MCF silica with basic metal oxides was to avoid coke deposition and metal sintering of the catalysts, thereby leading to large scale application of the catalysts for maximum $H_2$ production. SR of various compounds published in our previous studies over catalysts prepared without MCF silica as support has reported satisfactory cyclic stability up to 5-7 cycles (Shejale et al, 2017, 2018, 2019). Post this, the catalysts have deteriorated due to the sintering of metals, causing a decrease in surface area and catalytic activity. Thus, it is essential that the support stabilizes the catalyst in such a way that the sintering process is minimized or delayed leading to better cyclic stability. This phenomenon was evaluated by performing cyclic tests over the synthesized catalysts. The FIG. 09 (c), 10 (c), 11 (c) and 12 (c) clearly depict the drastic change in stability wherein the catalysts have remained stable for more than 10 cycles for all the catalysts as opposed to the catalyst prepared with MCF silica as only support which remained stable only up to 2-3 cycles. Hence, our fabricated catalysts are highly active and stable. These results ideally depict the synergistic role of MCF silica and basic metal oxides in increasing the catalyst stability and minimizing metal sintering of the catalysts. Several reasons can be given for the stability of MCF-S (MgO, $La_2O_3$, $CeO_2$) modified catalysts to be better than that of only MCF silica used as catalyst support.

Amongst the several reasons, the features of mesoporous catalysts like MCF silica like high surface area and porosity, better thermal stability, greater access to active sites than a well-known supported catalyst, all these lead to superior catalysts performance. As mentioned earlier, MCF silica promotes 'confinement effect' wherein it avoids the growth of metal particle size by assisting in greater dispersion of metals over the supports. Dispersing active metal nanoparticles is an excellent option to extend the interfacial boundary area and lower the use of these oxides. This behavior is further justified by the surface area, and porosity values of the catalysts post cyclic tests. It is obviously seen from Tables 5, and 6 that the loss in surface area is much lower as compared to catalysts without MCF reported previously (Shejale et al, 2017, 2018, 2019). Further, the XRD studies post cyclic tests clearly reveal that an increase in crystallite size is minimal for all the catalysts.

Next, the highly dispersed MCF-S (MgO, $La_2O_3$, $CeO_2$) support provides the $O^{2-}$ Lewis basic sites and oxygen vacancies in the system. Since, the existence of oxygen vacancies and its co-feeding lowers the threat of coke formation on the surface of the catalysts also helps in situ carbon oxidation, thereby avoiding its deactivation and improving catalyst activity and stability. These basic metal oxides, in fact, confines dehydration reaction to a well-known coke precursor i.e., ethylene, encourages water gas shift reaction, and its outstanding oxygen mobility helps to adsorb $CO_2$ dissociation that caused gasification or oxidation of deposited coke and ultimately improve catalyst activity and life.

Further, from the results of $H_2$-TPR, the interaction of active metals with MCF-S (MgO, $La_2O_3$, $CeO_2$) support was stronger than that of MCF silica as only support, which influences the stabilization of the active nanoparticles during the SR reaction. This state was owing to robust bonding between nickel and copper phyllosilicates and the surface of MCF silica. As reported earlier, because of the high pore diameter of the MCF silica support, it behaves like grafting spots for the active metals and alleviates their dispersion on the support surface, which avoids aggregation or metal sintering during high thermal treatment. Thus, MCF-S (MgO, $La_2O_3$, and $CeO_2$) modified catalysts with larger surface area, and pore diameter effectively suppresses carbon formation and sintering activity due to strong anchorage of active metal particles on the support.

CONCLUSIONS

The current work discussed the use of bio-based sources for selective hydrogen production employing novel MCF-S (MgO, $La_2O_3$, $CeO_2$) as effective support for incorporating several Ni-based catalysts. The role of each catalyst, along with its interaction with MCF based modified support, was demonstrated succinctly via several characterization techniques. Particularly, the key catalytic parameters, i.e., surface area and porosity and its effect on aging times, were evaluated. Characterization techniques like XPS assisted in describing an electronic state which justifies its strong metal-support interaction. The critical dimension of window pore size was reported to be highest with 72 h aging time for the catalysts leading to high surface area particles that are evident from TEM and XRD studies. The selected catalysts and support assisted in enhanced metal dispersion owing to its highly porous structure, nearly complete reactant conversion with good product yield, and longer stability. Further, the feature of greater resistance to metal sintering via the 'confinement effect' of MCF led to higher stability for all the catalysts. The effective metal-support interaction coupled with the absence of coke formation further justifies the synergistic effect of MCF silica and basic metal oxides prepared by the combination of hydrothermal and deposition co-precipitation technique as a cost-effective and sustainable catalyst-support system for enhanced $H_2$ synthesis.

I claim:

1. A steam reforming catalyst for sustainable hydrogen production using bio-based feedstock selected from ethanol, glycerol, n-butanol, and ethylene glycol comprising:
   a support having a combination of mesoporous cellular foam silica and basic metal oxides,
   at least two active metals doped on support having activity for steam reforming process;
   characterized in that the catalyst is having surface area between 300 to 600 ($m^2/g$), pore volume between 0.5 to 2.3 ($cm^3/g$) and average pore diameter between 9.0 to 18 nm.

2. The steam reforming catalyst as claimed in claim 1, wherein the combination of mesoporous cellular foam silica and basic metal oxide is selected from 2:3 mole ratio.

3. The steam reforming catalyst as claimed in claim 1, wherein basic metal oxides are selected from magnesium oxide, cerium oxide, and lanthanum oxide.

4. The steam reforming catalyst as claimed in claim 1, wherein active metals having activity for steam reforming process are selected from nickel, cobalt, copper and platinum.

5. The steam reforming catalyst as claimed in claim 1, wherein concentration of active metals on said support combination is ranging from 2.5 to 30 wt % of total weight of support.

6. The steam reforming catalyst for sustainable hydrogen production using bio based feedstock ethanol as claimed in claim 1, wherein catalyst has the support of the combination of mesoporous cellular foam silica: magnesium oxide in 2:3 mole ratio and is doped with active metals nickel 10 wt %, cobalt 10 wt % and copper 5 wt % of the total weight of support for steam reforming of ethanol (SRE).

7. The steam reforming catalyst for sustainable hydrogen production using feedstock glycerol as claimed in claim 1, wherein catalyst has the support of the combination of mesoporous cellular foam silica: lanthenium oxide in 2:3 mole ratio and is doped with active metals nickel 10 wt % and copper 10 wt % of the total weight of support for steam reforming of glycerol (SRG).

8. The steam reforming catalyst for sustainable hydrogen production using feedstock n-butanol as claimed in claim 1, wherein catalyst has the support of the combination of mesoporous cellular foam silica: lanthenium oxide in 2:3 mole ratio and is doped with active metals nickel 10 wt %, copper 10 wt % and platinum 2.5 wt % of the total weight of support for steam reforming of n-butanol (SRB).

9. The steam reforming catalyst for sustainable hydrogen production using feedstock ethylene glycol as claimed in claim 1, wherein catalyst has the combination of mesoporous cellular foam silica:cerium oxide in 2:3 mole ratio and is doped with active metals nickel 10 wt % and copper 10 wt % of the total weight of support for steam reforming of ethylene glycol (SREG).

\* \* \* \* \*